US005790242A

United States Patent [19]
Stern et al.

[11] Patent Number: 5,790,242
[45] Date of Patent: Aug. 4, 1998

[54] CHROMATIC OPTICAL RANGING SENSOR

[75] Inventors: Howard Stern, Greenlawn; Robert J. Metzger, Deer Park, both of N.Y.

[73] Assignee: Robotic Vision Systems, Inc., Hauppauge, N.Y.

[21] Appl. No.: 509,534

[22] Filed: Jul. 31, 1995

[51] Int. Cl.$^6$ .................................................. G01C 3/08
[52] U.S. Cl. ...................... 356/4.04; 356/4.05; 356/4.06
[58] Field of Search ................................ 356/4.04, 4.05, 356/4.06, 4.07

[56] References Cited

U.S. PATENT DOCUMENTS

| | | | |
|---|---|---|---|
| 3,567,320 | 3/1971 | Chitayat | 356/4.04 |
| 3,741,654 | 6/1973 | Brenholdt | 356/4.04 |
| 3,788,741 | 1/1974 | Buechler | 356/4.06 |
| 3,815,409 | 6/1974 | Macovski | 73/67.9 |
| 4,600,831 | 7/1986 | Hutley | 250/201 |
| 4,798,951 | 1/1989 | Walker | 356/373 |
| 5,479,258 | 12/1995 | Hinnrichs et al. | 356/326 |

OTHER PUBLICATIONS

Pure And Applied Optics, May 1995, pp. 219–228 H. Perrin et al., "Longitudinally dispersive profilometer".
Optical Engineering, vol. 27 No. 2, Feb. 1988, pp. 135–142 F. Quercioli et al., "Optical surface profile transducer".
Applied Optics, Apr. 1, 1994, pp. 135–142 H.J. Tiziani et al. "Three–dimensional image sensing by chromatic confocal microscopy".

*Primary Examiner*—Stephen C. Buczinski
*Attorney, Agent, or Firm*—Morrison Law Firm

[57] ABSTRACT

A three dimensional sensor includes an illumination source that produces broadband, high intensity optical energy. This optical energy includes a number of individual wavelength components. The individual wavelength components are impinged in a spot on a target. Dispersion is applied to the light reflected from the spot, either before target impingement, after target impingement, or both, whereby light of different colors is focused at different distances from the target. A maximum reflected wavelength, dependent on target range, is detected to determine the target range. In one embodiment, temporal modulation is applied to the light before target impingement. A stationary detector determines the target range by relating the maximum light received to the time it is received in order to determine the color received at that time. In another embodiment, all colors are reflected from the target simultaneously, and the reflected beam is chromatically dispersed in the transverse direction. A detector array, or a linear position sensor, is employed to determine the transverse position of the maximum amplitude of the transversely dispersed beam. The transverse position, being related to a particular color, contains information from which the range to the target is determinable.

33 Claims, 8 Drawing Sheets

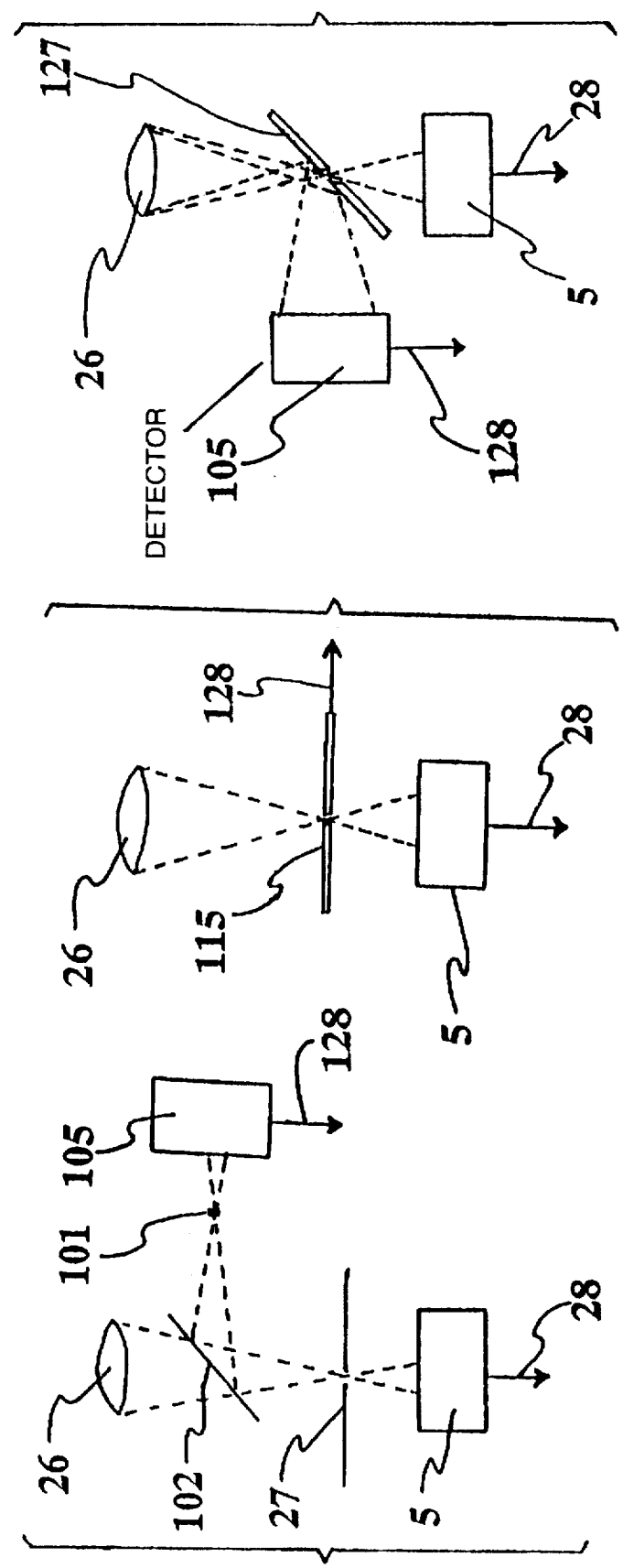

CHROMATIC OPTICAL RANGING SENSOR

BACKGROUND OF THE INVENTION

This invention relates to an apparatus and method for three dimensional (3-D) vision sensing and measurement. In particular, this invention relates to an apparatus and method for three dimensional vision sensing and measurement using chromatic range discrimination.

High technology industries are in the midst of a manufacturing revolution. Established industries such as integrated circuit (IC) manufacturing, electronics assembly, and precision metrology are facing unrelenting customer requirements for increasing and unprecedented levels of precision and speed. Emerging technologies such as precision mechanical assembly, opto-electronics assembly, and micro electromechanical systems (MEMS) will demand new capabilities that are a generation ahead of current and near-term commercial technology. While the discussion that follows focuses on a case study of semiconductor industry requirements, the technology that is described is suitable for a broad range of applications in both established and emerging industries.

The semiconductor industry has experienced a decade of unprecedented growth and technological advancements. Continual advances in circuit complexity and feature miniaturization have resulted in a requirement for substantially increased densities of input/output (I/O) leads. As a result, surface mount technology (SMT) packaging has largely replaced the traditional through-hole IC package. SMT leads, such as those on quad flat packs (QFP's), are soldered directly to connection pads on a surface of a circuit board, thereby permitting increased density of leads and a smaller device footprint. Recently, the new ball grid array (BGA) package has expanded the SMT class of devices. BGA replaces the peripheral SMT leads with a matrix of solder balls on the underside of the device. Future trends will extend the SMT concept to direct-attach methods such as flip chips, in which the connection bumps are integral to the wafer.

These new packaging technologies present significant challenges to device manufacturers. For SMT devices, the increased density of connections means that SMT leads must be significantly smaller than the leads of through hole devices. The physical fragility of the leads is a major concern. Any lead deformation can result in an inability to solder correctly the device to the board. Since test probes can temporarily deflect a bad lead and make a device test electrically good when it is physically bad, lead deformations are not always discovered by automated electrical test equipment. For BGA and flip chip devices, the solder balls and connection bumps must be precisely sized and located in order to mate properly with the corresponding pads on the printed circuit (PC) board.

A device's ensemble of SMT leads, BGA solder balls, or flip chip connection bumps is a 3-D structure which may exhibit monostable or bistable seating on a board. The ensemble may or may not be within acceptable tolerances for successful soldering during board assembly. Typical inspections of SMT devices with peripheral leads include checks of coplanarity, pin spread, pin width, gap width, true position spread, true position span, and lead angle. A typical inspection of a BGA device includes checks of coplanarity, true position error, pitch, ball diameter, and board warpage. The evolving requirements for flip chip devices are expected to include similar geometric requirements with substantially higher accuracies required than are needed for today's BGA's.

The accuracies required by manufacturers are between 5 µm (0.0002") and 12.5 µm (0.0005") for measurement of SMT device coplanarity, pin spread, pin width, pin gap, true position spread, and true position span. Current BGA technology demands similar accuracies. Near-term trends in BGA technology (mini BGA and micro BGA packages) and flip chip technology will inevitably demand accuracies of 1 µm or better. This requirement calls for an order of magnitude improvement in accuracy over current capabilities.

A number of commercial lead inspection systems use 2-D machine vision technology. Rather than measure the 3-D lead geometry directly, 2-D systems infer the 3-D shape from 2-D shadows. Because 2-D systems can only infer the true 3-D geometry from projections of that geometry, they are limited in their ability to characterize adequately the critical parameters of SMT leads. In addition, 2-D systems often seek to achieve adequate throughput by using multiple cameras. However, multiple cameras are susceptible to consequential calibration drift and accuracy degradation. Finally, all 2-D systems require extensive device handling that reduces throughput and damages the devices.

Other commercial systems use 3-D machine vision such as disclosed in U.S. Pat. Nos. 4,238,147, 4,590,367, 4,529,316, 4,594,001 and 4,991,968. Typical 3-D machine vision sensors are based on the well-established principle of structured-light optical triangulation. The object (e.g., SMT lead or BGA ball) is illuminated by a scanned, focused laser source. The reflected energy is captured by an offset camera. The known spatial relationship between the illumination source and the camera enables an accurate 3-D measurement to be computed. The combination of camera and structured light projector is a 3-D sensor.

It is desirable to enhance the familiar optical triangulation method to accommodate the impending high-resolution, high-throughput requirements. One technique for improving the resolution of optical triangulation is to increase the angular separation between transmitter and receiver. However, this improvement is incremental at best, only applies to one dimension (range resolution), and is achieved at the penalty of increased susceptibility to occlusion of the viewed surface by neighboring surfaces.

Another potential enhancement is to improve both the range resolution and lateral resolution by reducing a focused spot size of a transmitted laser beam. The spot size is directly proportional to the product of the f-number of the projection optics (as viewed from the target) and the laser wavelength. The projection optics may be improved incrementally, but not by an order of magnitude while maintaining depth-of-field.

Achieving shorter wavelengths and higher resolution is possible using higher frequency illumination sources. Current optical triangulation systems operate in the near infrared (800–900 nm wavelength). The shorter wavelengths of interest are in the deep ultraviolet (<300 nm). Unfortunately, the ultraviolet (UV) region is characterized by a lack of low-cost, solid-state illumination sources, very low photodetector sensitivity, and the degradation of optical components with use. UV wavelengths present major practical problems for a commercial, high duty-cycle inspection system.

A recently popular technique for high-accuracy optical measurement on semiconductor wafer surfaces, known as laser confocal microscopy, utilizes a diffraction-limited, monochromatic spot of light projected on a target surface. A pinhole in the focal plane of the receiver optics is mechanically translated in range. The returned energy through the pinhole is maximum when the focal plane coincides with the target surface image, thus enabling measurement of the target range. This technique is capable of submicron range resolution. However, it is a very slow process due to the mechanical servoing of a minimal depth-of-focus across the total depth-of-field where the target is to be found. Microscope calibration is difficult. The moving parts can wear with use, causing maintenance downtime.

Another recent technique uses the dispersion characteristics of a diffractive micro-Fresnel lens (MFL) in a spectrometer as outlined in "Spectrometer Employing a Micro-Fresnel Lens", Optical Engineering Vol. 34 No. 2, pp. 584–588 (February 1995). MFL's generally have large chromatic aberration. MFL's therefore transform the incident light spectrum into an intensity distribution along the optical axis. Different colors (wavelengths) have different focal lengths. A movable pinhole is positioned between a photodetector and a MFL. The light that passes through the pinhole is detected by the photodetector, which outputs a current corresponding to the light intensity of the light focused at the pinhole. An intensity distribution is obtained by moving the pinhole. The distances between the MFL and the pinhole passing focused light directly correspond to the wavelengths of the incident light. The spectrum of the incident light is thus obtained.

Conversely, if the wavelength of the incident light (and its attendant focal length) is known, the distance between the pinhole and the MFL is readily determined. An adaptation of this principle is used in the present invention.

OBJECTS AND SUMMARY OF THE INVENTION

It is an object of the present invention to overcome the drawbacks and limitations of the prior art.

It is another object of the present invention to provide a non-triangulation approach to optical 3-D measurement.

It is a further object of the present invention to provide a fast, efficient method and apparatus for sensing and measuring ranges on the order of a micron.

It is a still further object of the present invention to provide an optical ranging sensor that compensates for wavelength dependent reflectivity of a target.

The above and other objectives are realized by an apparatus and method in which a system projector includes a polychromatic incoherent illumination source. The system projector also includes an illumination modulator which establishes a time-varying illumination wavelength. The system projector further includes a diffractive lens which establishes a continuum of focal planes corresponding to the wavelengths in the illumination spectrum.

The present invention retains the high resolution capabilities of the confocal microscope and overcomes the deficiencies that prohibit the use of this technique in high-throughput, high duty-cycle industrial applications by replacing the mechanical scanning of a single focal plane with an illumination technique in which a continuum of focal planes encompasses a large depth-of-field. Signal processing electronics detect a location of a target surface with an accuracy exceeding a depth-of-focus of any individual focal plane. This technique results in rapid measurement that is configured to satisfy a wide range of high accuracy measurement requirements.

The present invention is based on the principle of chromatic range discrimination. Conventional laser-based 3-D sensors use coherent monochromatic illumination. In contrast, the present invention uses broadband incoherent or broadband coherent illumination. Conventional laser-based 3-D sensors illuminate the depth-of-field via mechanical motion. In contrast, the present invention uses a chromatic range scanner to illuminate the depth-of-field electronically. Conventional laser-based 3-D triangulation sensors rely on the geometry of the entire sensor (transmitter and receiver) to achieve range resolution.

Reconfiguring the sensor for different applications requiring different performance parameters often requires significant redesign. In contrast, the present invention is readily reconfigured using interchangeable objective lenses. Conventional laser-based 3-D triangulation sensors require that both transmitted and received rays be totally unimpeded, thus necessitating a large angular region between the sensor and the object remaining totally unobstructed. The present invention significantly reduces the occlusion limitations of high-accuracy optical triangulation sensors. Partial occlusion only slightly reduces the returned energy (i.e., slightly decreases the signal-to-noise ratio) and does not cause the sensor to fail to detect the object surface.

Briefly stated, a three dimensional sensor includes an illumination source that produces broadband, high intensity optical energy. This optical energy includes a number of individual wavelength components. The individual wavelength components are impinged in a spot on a target. Dispersion is applied to the light reflected from the spot, either before target impingement, after target impingement, or both, whereby light of different colors is focused at different distances from the target. A maximum reflected wavelength, dependent on target range, is detected to determine the target range. In one embodiment, temporal modulation is applied to the light before target impingement. A stationary detector determines the target range by relating the maximum light received to the time it is received in order to determine the color received at that time. In another embodiment, all colors are reflected from the target simultaneously, and the reflected beam is chromatically dispersed in the transverse direction. A detector array, or a linear position sensor, is employed to determine the transverse position of the maximum amplitude of the transversely dispersed beam. The transverse position, being related to a particular color, contains information from which the range to the target is determinable.

According to an embodiment of the invention, a chromatic optical ranging sensor includes means for time modulating optical energy by wavelength to produce a time modulated beam, means for focusing the time modulated beam onto a target from a known location, whereby different wavelengths of the time modulated beam are focused at different distances from the known location, means for collecting a reflected beam from the target, and means for detecting and interpolating the reflected beam to determine a distance of the target from the known location.

According to an embodiment of the invention, a chromatic optical ranging sensor includes means for focusing a source beam of optical energy onto a target from a known location, whereby different wavelengths of the source beam are focused at different distances from the known location, means for collecting a reflected beam from the target, and means for detecting and interpolating the reflected beam to determine a distance of the target from the known location.

According to an embodiment of the invention, a three-dimensional sensor includes means for providing broadband, high intensity optical energy, the optical energy including a plurality of individual wavelength components, means for polarizing the optical energy, means for tuning the polarized optical energy so that the range of polarizations of the optical energy corresponds to a range of optical wavelengths, means for selectively transmitting the optical energy according to a particular oriented polarization, means for focusing the optical energy onto a target from a known location, means for collecting a reflected beam from the target, and means for detecting and interpolating the reflected beam to determine a range of the target from the known location.

According to an embodiment of the invention, a precision ranging sensor includes a polychromatic source of light, means for illuminating a target with a spot of the polychromatic light to produce a reflected beam, means for applying dispersion to the polychromatic light, whereby different wavelengths of the polychromatic light are focusable at different distances, and means for detecting a wavelength at which the reflected beam has a maximum amplitude, wherein the maximum amplitude is related to a distance between the target and the means for applying dispersion.

According to an embodiment of the invention, a chromatic optical ranging sensor includes means for time modulating optical energy by wavelength to produce a time modulated beam, means for focusing said time modulated beam onto a target from a known location, whereby different wavelengths of said time modulated beam are focused at different distances from said known location, means for collecting a reflected beam from said target, means for detecting and interpolating said reflected beam to determine a distance of said target from said known location, and means for compensating for wavelength dependent reflectivity in said target.

According to an embodiment of the invention, a chromatic optical ranging sensor includes means for focusing a source beam of optical energy onto a target from a known location, whereby different wavelengths of said source beam are focused at different distances from said known location, means for collecting a reflected beam from said target, means for detecting and interpolating said reflected beam to determine a distance of said target from said known location, and means for compensating for wavelength dependent reflectivity in said target.

According to an embodiment of the invention, a three-dimensional sensor includes means for providing broadband, high intensity optical energy, said optical energy including a plurality of individual wavelength components, means for polarizing said optical energy, means for tuning said polarized optical energy so that said range of polarizations of said optical energy corresponds to a range of optical wavelengths, means for selectively transmitting said optical energy according to a particular oriented polarization, means for focusing said optical energy onto a target from a known location, means for collecting a reflected beam from said target, means for detecting and interpolating said reflected beam to determine a range of said target from said known location, and means for compensating for wavelength dependent reflectivity in said target.

According to an embodiment of the invention, a precision ranging sensor includes a polychromatic source of light, means for illuminating a target with a spot of said polychromatic light to produce a reflected beam, means for applying dispersion to said polychromatic light, whereby different wavelengths of said polychromatic light are focusable at different distances, means for detecting a wavelength at which said reflected beam has a maximum amplitude, wherein said maximum amplitude is related to a distance between said target and said means for applying dispersion, and means for compensating for wavelength dependent reflectivity in said target.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7a is an exploded top view of an embodiment for detecting an output from a target being sensed that removes wavelength dependent reflectivity from the depth calculation.

FIG. 7b is an exploded top view of an alternative embodiment for detecting an output from a target being sensed that removes wavelength dependent reflectivity from the depth calculation.

FIG. 7c is an exploded top view of an alternative embodiment for detecting an output from a target being sensed that removes wavelength dependent reflectivity from the depth calculation.

FIG. 8b is an exploded top view of an alternative embodiment for detecting an output from a target being sensed that removes wavelength dependent reflectivity from the depth calculation by incorporating the fiberoptic bundle of FIG. 8a.

DETAILED DESCRIPTION OF THE PREFERRED EMBODIMENT

Figure 1:
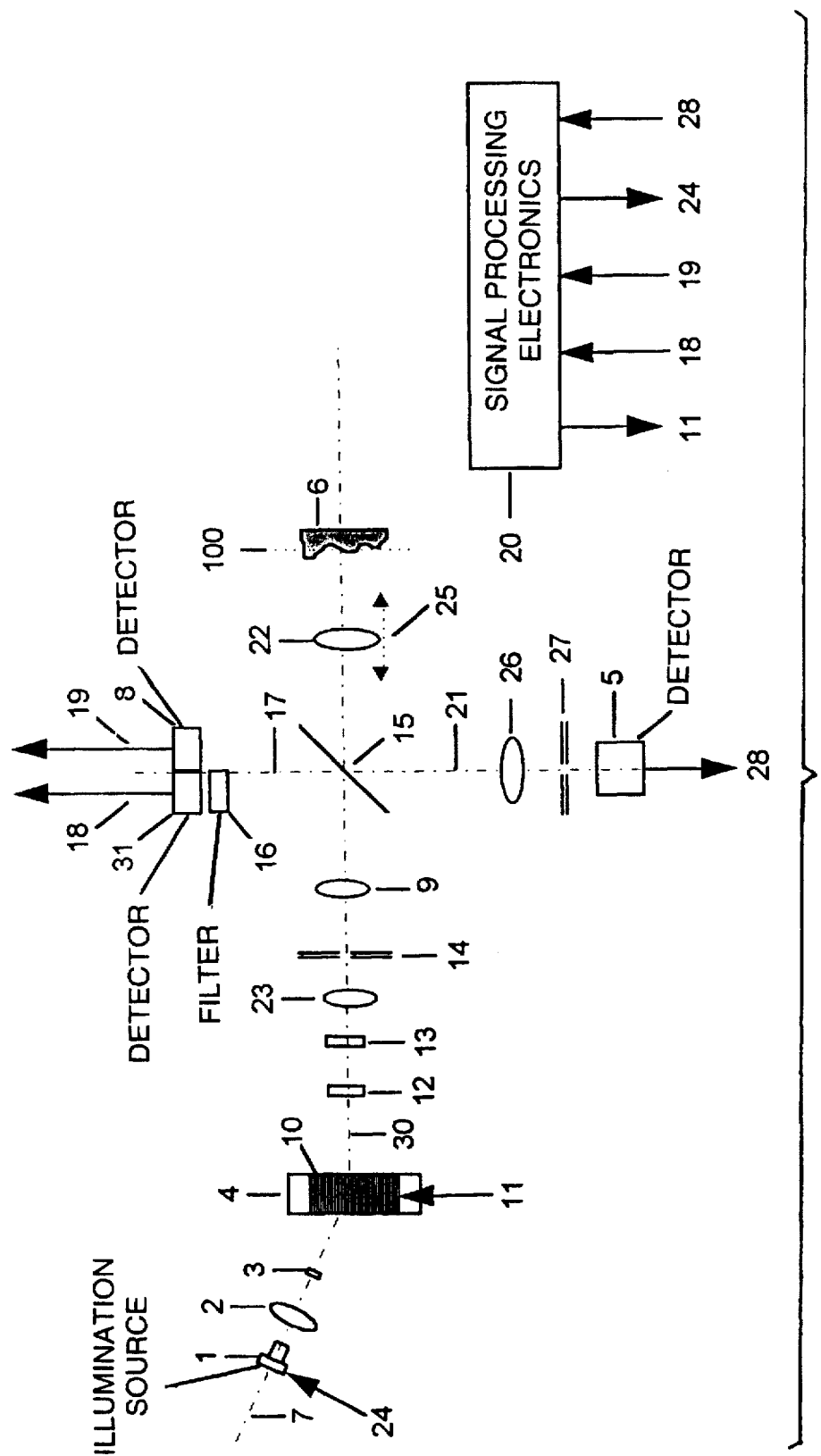
FIG. 1 is an exploded top view of a 3-D sensor according to a first embodiment of the present invention.

Referring to FIG. 1, a basic 3-D sensor according to an embodiment of the present invention is shown. The sensor uses acousto-optical beam deflection. An illumination source 1 produces broadband, high intensity optical energy. Illumination source 1 is, for example, a solid state superluminescent LED such as Model 861 30E-15 manufactured by EG&G Optoelectronics Division, a high intensity xenon short arc lamp, a tunable laser, or a pulsed laser having a broadband wavelength distribution. Illumination source 1 preferably is super bright and has approximately a 30 nm wavelength spread. The Model 861 30E-15 superluminescent LED has a center wavelength of 850 nm and ranges from 840 nm to 860 nm.

An output of illumination source 1 is corrected for astigmatism and collimated by a lens 2. For example, if illumination source 1 is a superluminescent LED, the output of source 1 in the absence of lens 2 is divergent, asymmetrical (with an elliptical cross-section), and quasi-diffraction-limited with a beam divergence that is greatest across the narrowest dimension of a cross-section of the LED emitter normal to an optical axis 7. Since the output of the superluminescent LED is highly linearly polarized, the collimated output of lens 2 is passed through a quarter wave plate 3 to convert the highly linearly polarized output of illumination source 1 to circularly polarized light. Using circularly polarized light avoids potential uneven effects of linearly polarized light in the optics used in the invention. All optics in this specification (unless otherwise stated) are preferably achromatic with the exception of an objective lens 22.

The prepared beam emerging from quarter wave plate 3 is collimated, with the beam cross section filling an input window of an acousto-optic (AO) modulator 4. Modulator 4 contains a photoelastic crystal 10. An acoustic wave propagating in crystal 10 varies the index of refraction of crystal 10. Crystal 10 then acts as a diffraction grating, causing the incident beam to deflect as a function of the acoustic wavelength. The acoustic wavelength is determined by a radio frequency (RF) drive signal 11. The incident beam deflects to a direction around an optical axis 30.

Crystal 10 is also wavelength dispersive. That is, in addition to its deflection angle being controlled by RF drive signal 11, the deflection angle of an incident beam is also directly proportional to an optical wavelength of the incident beam. Modulator 4 both disperses the individual wavelength components of broadband illumination source 1 and deflects the dispersed wavelengths. If $\theta$ denotes the diffraction angle of modulator 4 measured in radians, $\lambda$ denotes the optical wavelength measured in meters, F denotes the frequency of RF drive signal 11 measured in Hertz, and v denotes the acoustic velocity of crystal 10 measured in meters per second, then for any $\lambda$ and F, $\theta = \lambda * F \div v$.

The beam emerging from modulator 4 is shaped by a lens 12 and a lens 13. In some cases, lens 12 and lens 13 are cylindrical lenses or have cylindrical elements. The shaped beam is focused onto a pinhole 14 by a lens 23. With a swept or stepped RF wavelength of RF drive signal 11, the dispersion of the beam focuses different wavelengths on pinhole 14 at different times. As modulator 4 deflects the dispersed wavelengths across pinhole 14, the beam that emerges from pinhole 14 contains a sequence of wavelengths as a function of time. In other words, pinhole 14 acts as a gate for the modulated beam, letting a particular wavelength, or color, through the gate at a particular time. The sequence of wavelengths is collimated by a lens 9. The collimated beam is incident on a beamsplitter 15. Beamsplitter 15 is wavelength and polarization insensitive. A first portion of the beam is transmitted through beamsplitter 15 to an objective lens 22.

A second portion of the beam is reflected upward in the figure by beam splitter 15 onto an optical axis 17. Optical axis 17 leads to side by side detectors 8 and 31. A filter 16 is interposed in optical axis 17 in front of detector 31, but not in front of detector 8. Filter 16 is a bandpass filter matched to the optical spectrum of illumination source 1. Filter 16 produces a sharp pulse when the optical energy incident on filter 16 matches a particular synchronization point, thereby allowing two-point calibration. Detector 31 outputs a beam edge calibration signal 18. Signal 18 is used by signal processing electronics 20 to establish a precise time base for analysis of the received target energy.

Detector 8 outputs a beam amplitude calibration signal 19 that describes an amplitude of received light as a function of time. Signal 19 is used by signal processing electronics 20 to monitor, and therefore minimize via feedback, combined effects of the variable energy level emitted by illumination source 1 as a function of wavelength, variable diffractive efficiency of modulator 4 as a function of wavelength, and any non-uniformity of transmissive wavelength response in collimation lens 2, quarter wave plate 3, modulator 4, lens 12, lens 13, lens 23, and lens 9. For example, one objective is to keep the intensity of the light constant. If the distribution of the intensity of the light versus the wavelength produced by illumination source 1 is Gaussian, increasing the current to illumination source 1 at either end of the scanning range evens out the intensity at all wavelengths. Signal 19 is used by signal processing electronics 20 to normalize the response of the sensor to achieve uniform sensitivity across the optical bandwidth of illumination source 1. Signal 19 is also used by signal processing electronics 20 to regulate a drive signal 24 for illumination source 1, thereby minimizing temporal variation in the output of illumination source 1.

Objective lens 22 projects the first portion of the beam onto a target 6. Preferably objective lens 22 is a diffractive objective lens to establish a distinct focal plane 100 for each illumination wavelength. If, for example, objective lens 22 has a focal length of 100 mm, the total depth of focus across the wavelengths varies by 3.5 mm. In conjunction with the previously discussed optical elements, objective lens 22 establishes a temporally scanned focal point for which each range corresponds to a different transmitted wavelength. Longer wavelengths are focused closer to objective lens 22 and shorter wavelengths are focused farther away. Objective lens 22 is preferably fabricated by etching a surface of the lens to create a surface relief hologram (binary optic), by exposing an emulsion to create a volume hologram, or by manufacturing a micro-Fresnel lens (MFL). A suitable objective lens 22 is custom-manufactured by companies such as Teledyne Brown Engineering using techniques such as ion milling or reactive ion etching. A positioner 25 establishes a coarse location in range of the scanned depth-of-field by mechanically positioning objective lens 22.

The focused light reflected from target 6 is collimated since it is reflected from a point. The reflected light is returned through objective lens 22 and reflected by beamsplitter 15 along an optical axis 21. The light is then focused onto a pinhole 27 by a lens 26. The light passing through pinhole 27 is incident on a detector 5. Lens 26 has negligible chromatic dispersion. Lenses 9, 22, and 26 preferably are approximately the same size. Pinhole 27 passes only the reflected light from the central maximum of the diffraction pattern of objective lens 22. The light that passes through pinhole 27 exhibits a high degree of wavelength dispersion. This wavelength dispersion is a function of the distance from objective lens 22 of the particular point on the target from which the light is being reflected. Detector 5 is preferably a high gain avalanche photodiode (APD) or a silicon PIN diode in a current integrating mode. Detector 5 outputs a signal 28 which consists of a pulse whose temporal centroid corresponds to the distance between objective lens 22 and the point on target 6. The temporal width of this pulse is approximately proportional to the depth-of-focus of objective lens 22.

An example of the calculation to determine the height of the peak of a pulse includes:

1) Compute an amplitude that is 70% of the height of the peak.
2) Find the 70% amplitude at the beginning and end of the pulse to obtain two times.

3) Average these two times to obtain the centroid.
4) Use standard interpolation techniques in signal processing electronics 20 to locate the pulse centroid to a small fraction of the wavelength resolution.

Figure 2:
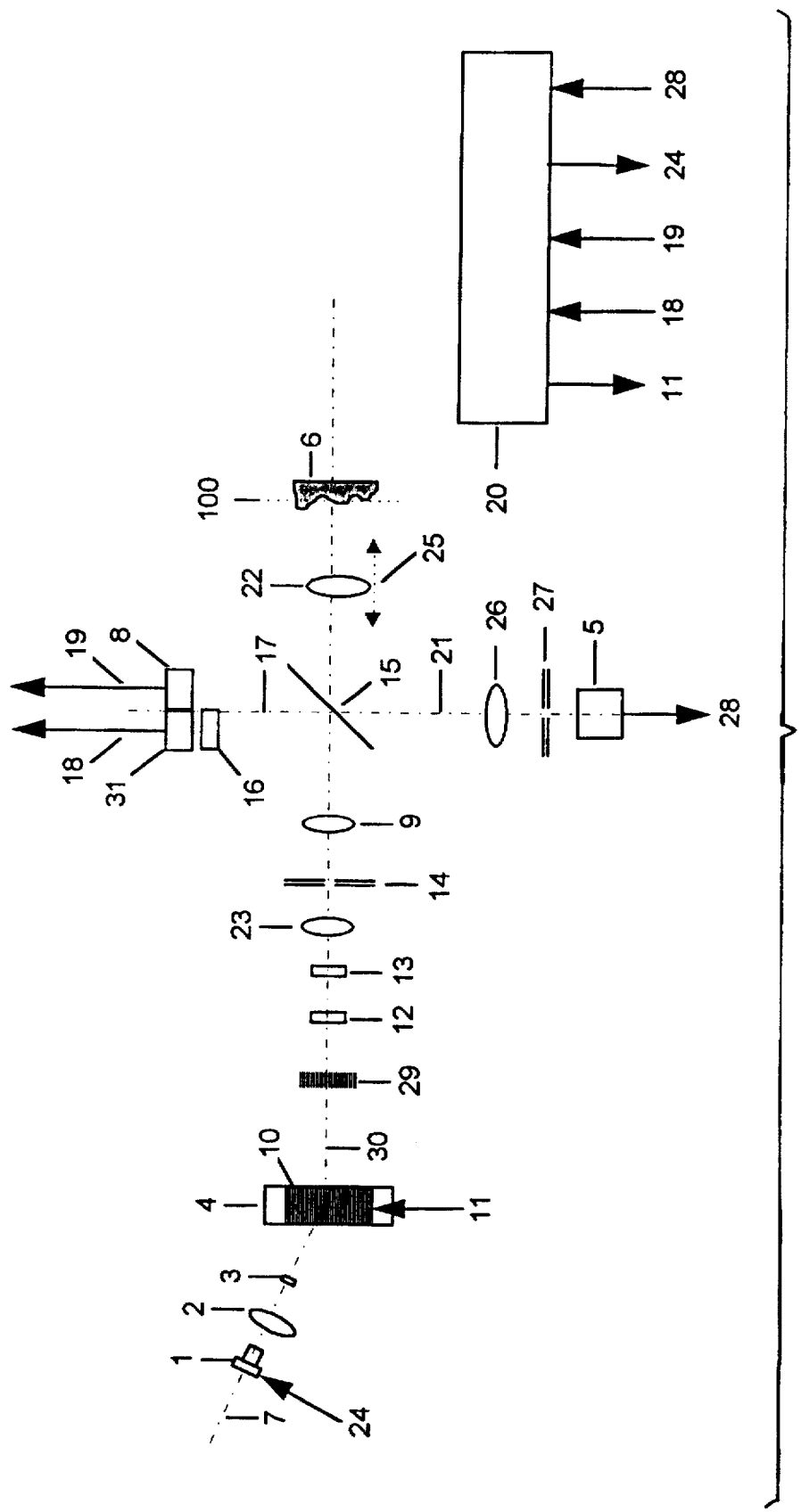
FIG. 2 is an exploded top view of a 3-D sensor according to a second embodiment of the present invention.

Referring to FIG. 2, an alternative embodiment is shown which differs from the embodiment of FIG. 1 by the addition of a diffraction grating 29 between photoelastic crystal 10 and lens 12 to improve the resolution of the sensor shown in FIG. 1.

Diffraction grating 29 spatially disperses the broadband optical wavelengths produced by illumination source 1. The spatial dispersion from diffraction grating 29 is in addition to the spatial dispersion from modulator 4. Combining modulator 4 and diffraction grating 29 increases a range of beam deflection angles for the optical bandwidth of illumination source 1. The light that passes through pinhole 14 therefore exhibits increased temporal wavelength resolution. The increased temporal wavelength resolution results in increased measurement resolution of the target range by signal processing electronics 20. A wavelength-dispersing prism (not shown) is optionally used in place of diffraction grating 29.

Figure 3:
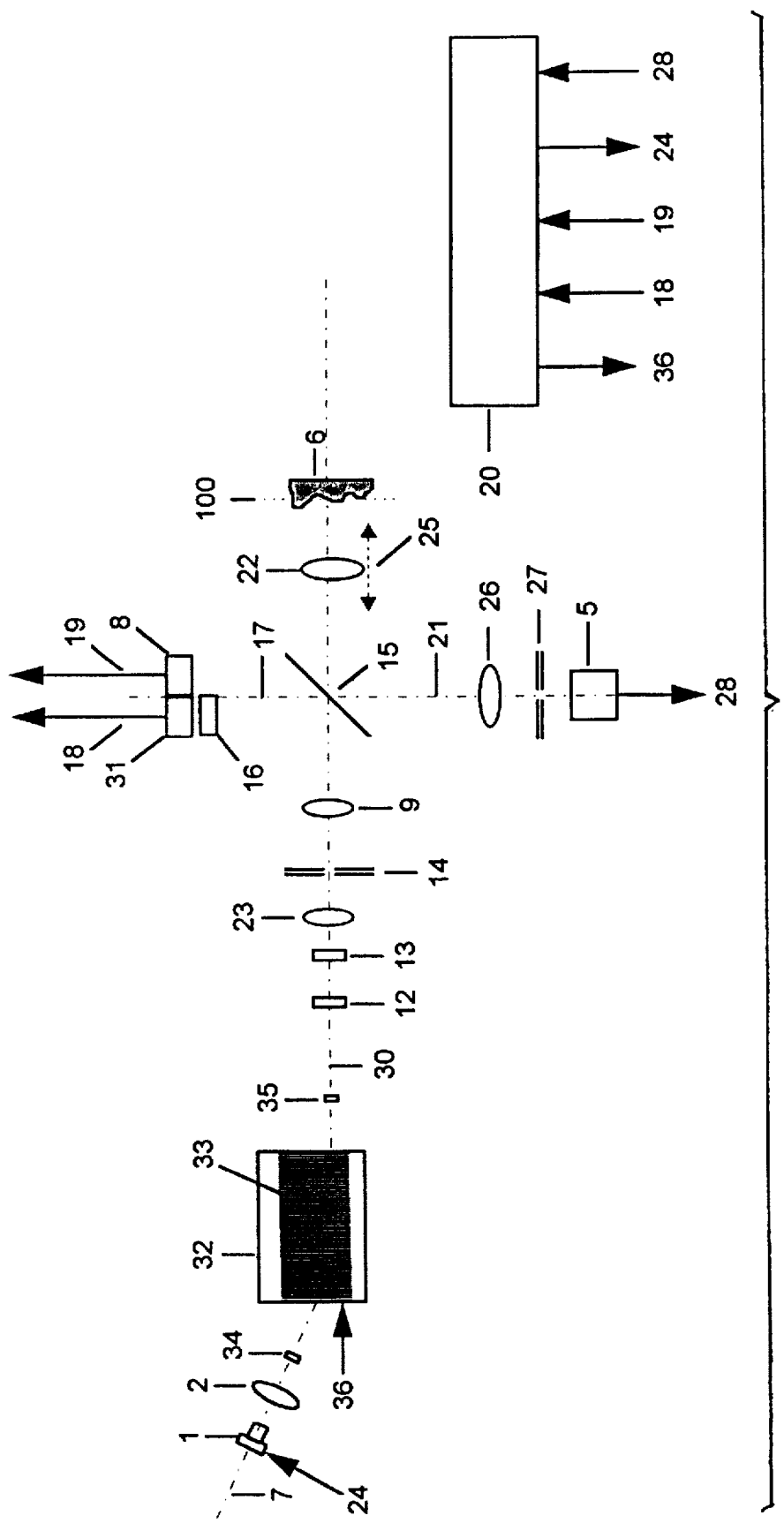
FIG. 3 is an exploded top view of a 3-D sensor according to a third embodiment of the present invention.

Referring to FIG. 3, an alternative embodiment is shown which differs from the embodiment of FIG. 2 by the substitution of a tunable filter 32, a crystal 33, and a signal 36 in place of modulator 4, crystal 10, and signal 11, respectively. In addition, two polarizers 34 and 35 are added and diffraction grating 29 is removed. The collimated output of lens 2 passes through polarizer 34, thereby refining the strongly linearly polarized output of LED illumination source 1 to a uniform linear polarization for all wavelengths. With the exception of objective lens 22, all optics are achromatic. The prepared beam emerging from polarizer 34 is incident upon tunable filter 32. Tunable filter 32 contains an anisotropic, birefringent acousto-optic (AO) crystal 33. When an acoustic wave is propagated in AO crystal 33, an optical wavelength transmitted by crystal 33 varies as a function of a frequency of the acoustic wave. Uniformly polarized broadband incident illumination emerges from tunable filter 32 with a range of polarizations corresponding to a range of optical wavelengths. Polarizer 35, also known as an analyzer, selectively transmits only that light with a correctly oriented polarization. In practice, the light transmitted by the polarizer 35 is effectively monochromatic. Signal 36 establishes the frequency of the acoustic wave, thereby permitting tunable control of the wavelength passed by polarizer 35. Therefore, the output of polarizer 35 contains a sequence of wavelengths as a function of time. With the exception of pinhole 14, all other elements function as previously described. In FIGS. 1 and 2, pinhole 14 serves the dual function of wavelength selection and spatial filtering. In FIG. 3, pinhole 14 serves only as a spatial filter while tunable filter 32 accomplishes wavelength selection.

Figure 4:
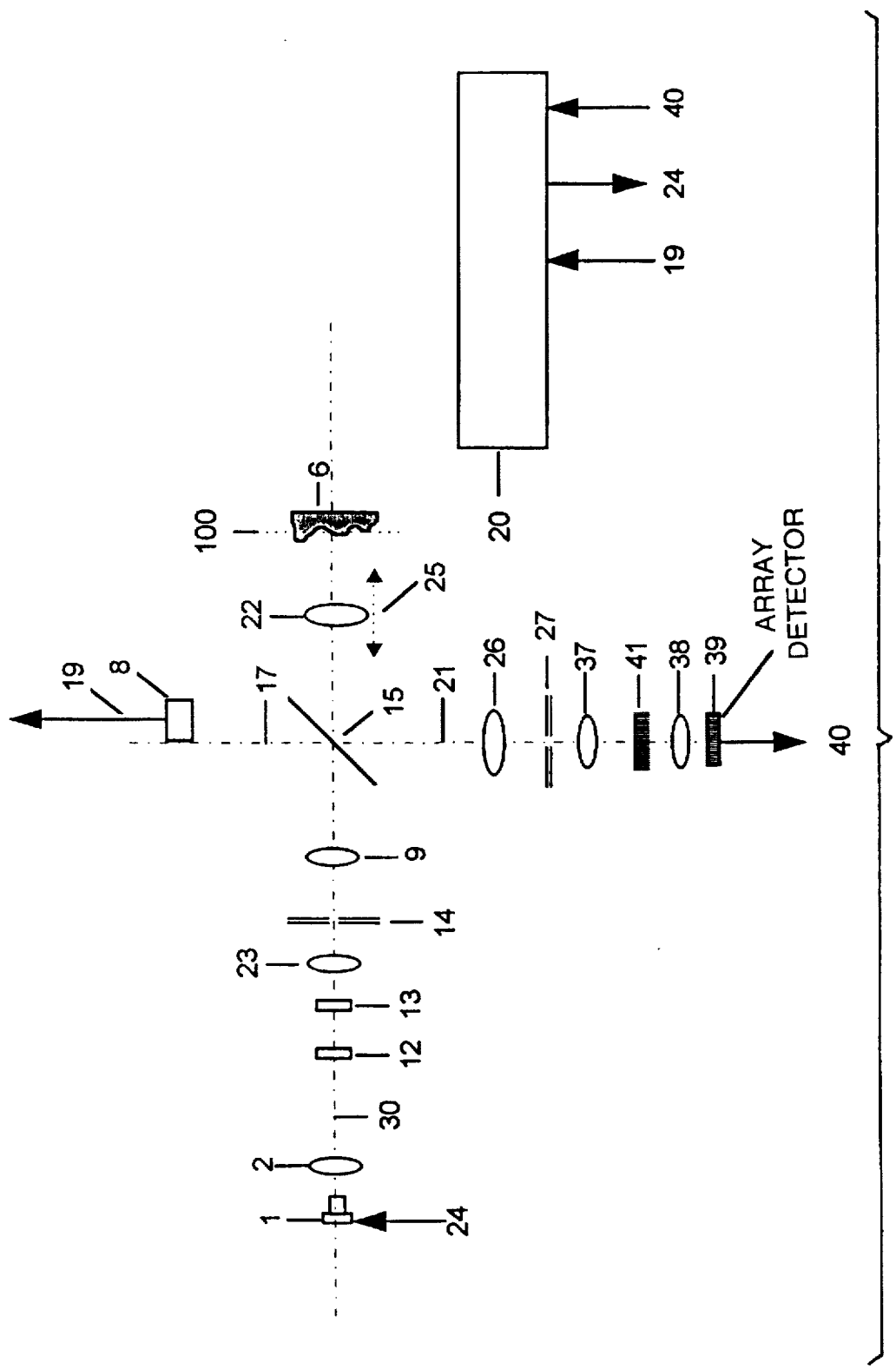
FIG. 4 is an exploded top view of a 3-D sensor according to a fourth embodiment of the present invention.

Referring to FIG. 4, an alternative embodiment is shown which differs from the embodiment of FIG. 3 by substituting an array detector 39 and a signal 40 for detector 5 and signal 28, respectively. In addition, a lens 37 is added, while optical axis 7, filter 16, signal 18, detector 31, tunable filter 32, crystal 33, polarizer 34, polarizer 35, and signal 36 are removed.

The sensor configuration of FIG. 4 uses a range of simultaneously transmitted wavelengths to illuminate the entire depth of field. This is in contrast to the sensor configurations of FIGS. 1-3, each of which uses sequentially transmitted wavelengths to scan the depth of field as the transmitted wavelength is changed. The collimated output of lens 2 is shaped by a lens 12 and a lens 13. The shaped beam is focused onto a pinhole 14 by a lens 23. The beam that emerges from pinhole 14 contains the full optical spectrum of broadband illumination source 1. The broadband beam is then collimated by a lens 9. The collimated beam is incident on a beamsplitter 15. A first portion of the beam is transmitted through beamsplitter 15 to objective lens 22. A second portion of the beam is reflected by beamsplitter 15, redirected to an optical axis 17, where it is incident on a detector 8.

Objective lens 22 projects the first portion of the beam onto a target 6, with a different focal plane 100 for each wavelength. As previously described in the first embodiment, longer wavelengths are focused closer to objective lens 22 and shorter wavelengths are focused farther away. More light of the wavelength that is most closely focused on target 6 is reflected than is light of other wavelengths. The light reflected from target 6 is collected by objective lens 22 and reflected by beamsplitter 15 along an optical axis 21. The reflected light is focused onto a pinhole 27 by a lens 26. The light emerging from pinhole 27 is collimated by lens 37.

The collimated beam emerging from lens 37 is incident on a diffraction grating 41. Diffraction grating 41 causes spatial dispersion of the broadband optical wavelengths reflected by target 6. A wavelength-dispersing prism optionally may be used for this purpose. This spatial wavelength dispersion substitutes for the temporal wavelength dispersion in the sensors illustrated by FIGS. 1-3. The spatially-dispersed wavelengths emerging from diffraction grating 41 are focused by a lens 38 onto array detector 39. Different wavelengths are incident simultaneously on different cells of array detector 39 due to the spatial dispersion.

Array detector 39 is an array of any suitable detectors such as high gain avalanche photodiodes (APD's), silicon PIN diodes, charge coupled device (CCD) photodetectors, or a microchannel plate (MCP) image intensifier which contains a CCD or other array. Each distinct resolution cell of array detector 39 detects energy in a distinct narrow wavelength band contained within the broad wavelength band of illumination source 1. Each distinct resolution cell of array detector 39 detects energy corresponding to a distinct narrow range interval contained within the large depth of field of objective lens 22. Signal 40, the electrical output of detector 39, includes either a sequential readout of the detected signal for all resolution cells of detector 39, or a simultaneous parallel readout of the detected signals from all of the resolution cells of detector 39. Signal 40 is analog or digital depending on the particular device used as detector 39. Using standard interpolation techniques, signal processing electronics 20 resolves the location of the target to a small fraction of a resolution cell of detector 39.

Figure 5:
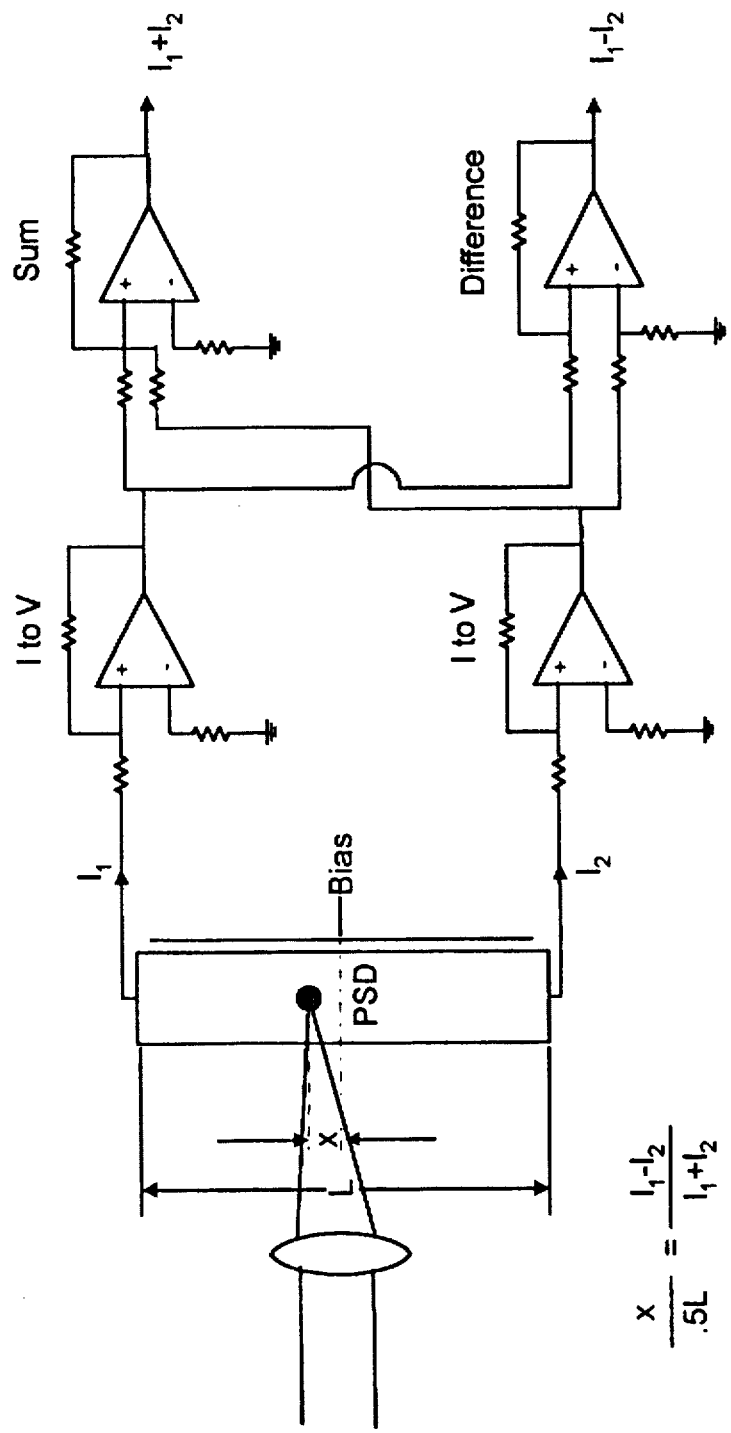
FIG. 5 is a schematic of an alternative embodiment for detecting and interpolating an output reflected from a target being sensed.

Referring to FIG. 5, an alternative to the array detector of the previous embodiment is a linear position sensing detector PSD which outputs currents $I_1$ and $I_2$ proportional to a location of the focused light along a length L of the PSD. A conventional OP AMP arrangement outputs a sum $I_1+I_2$ and a difference $I_1-I_2$ which are used to determine an offset x of the focused light according to the equation $$0.5L(I_1-I_2)=x(I_1+I_2).$$

Lens 38 is preferably a binary optic lens such as is manufactured by Teledyne Brown Engineering. A binary optic lens with grating (not shown) optionally is used in place of diffraction grating 41 and lens 38. Other detectors that perform the same function, such as dual detectors used with spatially linearly varying optical attenuators, optionally are used to perform the same function and are well known in the art.

Figure 6:
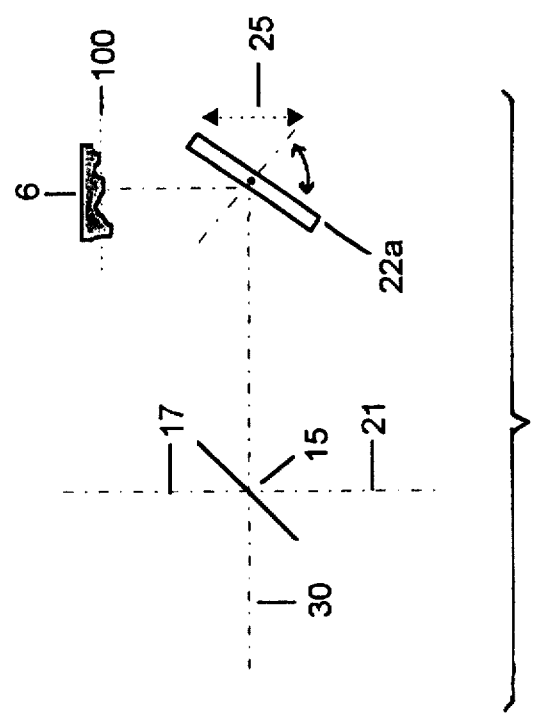
FIG. 6 is an exploded top view of an alternative embodiment for projecting optical energy onto a target being sensed.

Referring to FIG. 6, an alternative to objective lens 22 in each embodiment includes a lens element 22a which is a Fresnel or diffractive mirror which changes its focal length depending on the wavelength. In such a case, the light beam is deflected according to an angle between the illuminating beam and the normal to the mirror surface of lens element 22a. A positioner 25 moves along a normal to a target 6 to establish a coarse range location of the scanned depth-of field by mechanically positioning lens element 22a.

In an alternative embodiment, lens element 22a is rotatable around an axis 250, thereby causing the sampling beam to scan across the surface of target 6. Thus, lens element 22a is rotated instead of moving the sensor or the target.

In certain applications target 6 has wavelength sensitive reflectivity in the energy band used to perform the depth measurement. It is therefore desirable to use a means for compensating that removes the wavelength sensitive reflectivity from the depth calculation.

Referring to FIG. 7a, an arrangement for compensating for wavelength sensitive reflectivity of target 6 is shown. After the light reflected from target 6 is focused by lens 26 as shown in FIGS. 1, 2, or 3, a beamsplitter 102 diverts some of the optical energy, preferably half, to a central stop 101. Central stop 101 acts as an inverse pinhole, blocking that portion of the optical energy that is precisely focused on it. The optical energy blocked by central stop 101 equals the optical energy passed through pinhole 27. A detector 105 detects that optical energy that passes central stop 101, which equals the optical energy not passed by pinhole 27. Detector 105 outputs a signal 128 to signal processing electronics 20. Signal processing electronics 20 finds an instant of time within the sweep when a ratio of the amplitude of the output of detector 5 to the amplitude of the output of detector 105 is at its maximum.

At this instant of time, the energy passed through pinhole 27 is a result of the light being reflected off target 6 due to target 6 being at the focal point of objective lens 22 rather than being a result of the light reflected off target 6 due to a particular wavelength sensitive reflectivity. A calibrated depth for the wavelength transmitted at this instant of time therefore corresponds to the depth of the surface of target 6 since the ratio depends only upon the focus to pinhole 27 and is independent of the reflectivity of target 6.

The sizes of detectors 5 and 105 optionally are reduced by adding field lenses (not shown) between pinhole 27 and detector 5 and between central stop 101 and detector 105.

Referring to FIG. 7b, an alternative embodiment for removing the wavelength reflectivity from the depth calculation replaces pinhole 27 with a detector 115 with a pinhole in it. This embodiment avoids the energy lost by beamsplitter 102 shown in FIG. 7a. Detector 115 directly detects and outputs signal 128 representing the energy not passing through the pinhole. Signal 128 is used in this embodiment the same as previously described for the embodiment of FIG. 7a.

Referring to FIG. 7c, an alternative embodiment is shown which also avoids beamsplitter losses while removing the wavelength reflectivity from the depth calculation. Pinhole 27 of FIG. 7a is replaced by a mirrored pinhole 127 which reflects that portion of optical energy not passing through the pinhole. Detector 105 and signal 128 are used as previously described in the embodiment of FIG. 7a.

In each embodiment shown in FIGS. 7a–7c, the peaking of the ratio of the signal from detector 5 divided by the signal from detectors 105 or 115, as appropriate, corresponds to the range of the surface of target 6 as indicated by the best focus of the light incident on target 6. In other words, a ratio of focused color light to unfocused color light is obtained. The unfocused color light is detected by detectors 105 or 115. Comparing the ratio of the focused light to the unfocused light prevents obtaining false readings from some color sensitive characteristic of target 6.

The principle embodied in the separation methods of the embodiments of FIGS. 7a, 7b, and 7c is used to remove sensitivity to target color vs. reflectivity variations from the embodiments of FIGS. 1–4 by separating the light leaving lens 26 into two paths. One path includes only light passing through pinhole 27. The other path includes only light passing around pinhole 27. However, there are problems associated with using any of the embodiments of FIGS. 7a–7c with the embodiment of FIG. 4, because of the need to spatially disperse the broadband optical wavelengths reflected by target 6.

Figure 8B:
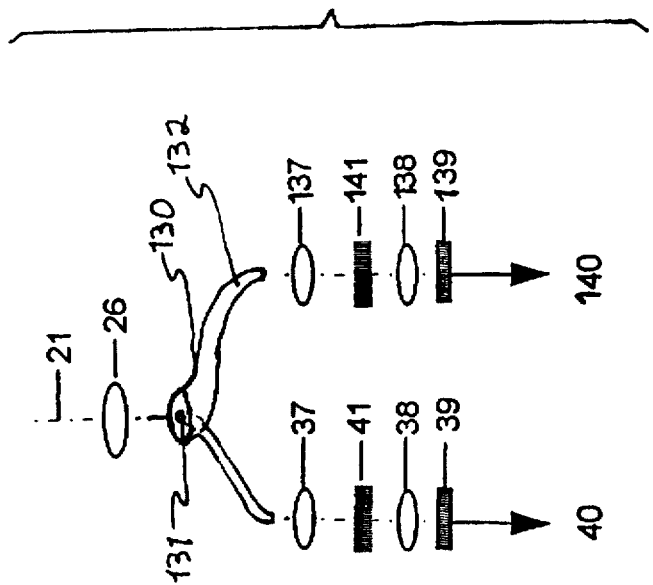
Figure 8A:
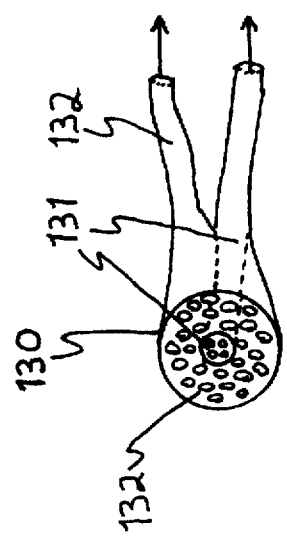
FIG. 8a is a perspective view of a fiberoptic bundle for detecting an output from a target being sensed that removes wavelength dependent reflectivity from the depth calculation.

Referring to FIGS. 8a–8b, a fiberoptic bundle 130 accomplishes the same separation of paths. An end of fiberoptic bundle 130 is positioned at the same distance from lens 26 as pinhole 27 in FIG. 4. An inner portion 131 is sized the same as pinhole 27. An outer portion 132 surrounds inner portion 131. Inner portion 131 receives the same light as pinhole 27 would have, while outer portion 132 receives the light that would have been blocked. That is, inner portion 131 receives primarily focused light while outer portion 132 receives unfocused light. Thus the separation of the light reflected from target 6 into focused and unfocused light is accomplished.

The light from inner portion 131 passes through lens 37, diffraction grating 41, lens 38, and onto array detector 39 as described in the FIG. 4 embodiment. Different wavelengths are incident simultaneously on different cells of array detector 39 due to the spatial dispersion. Signal 40 therefore is a measure of the focused light reflected from target 6. The light from outer portion 132 similarly passes through a lens 137, a diffraction grating 141, a lens 138, and onto an array detector 139. Signal 140 is a measure of the unfocused light reflected from target 6.

A ratio is calculated indicative of best focus independently of target reflectivity vs. wavelength. The ratio of energy passing through inner portion 131 to energy passing through outer portion 132 is at a maximum for the color (wavelength) at which focus is best. Care must be taken to ensure that enough signal is present to avoid dividing by zero when calculating the ratio.

It is preferable to have the same number of fibers receiving energy in inner portion 131 as in outer portion 132 to simplify the calculations. Then, if only unfocused light is reflected from target 6, the ratio of light received in inner portion 131 to light received in outer portion 132 is 1:1. The ratio changes as more and more focused light is received in inner portion 131.

It is further contemplated that the invention may be practiced with varying wavelengths of electromagnetic energy ranging from below the deep ultraviolet to the long infrared.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A chromatic optical ranging sensor, comprising:
   means for modulating a plurality of optical energy wavelengths over time to produce a time modulated beam;

means for focusing said time modulated beam onto a target from a known location, whereby different wavelengths of said time modulated beam are focused at different distances from said known location;

means for collecting a reflected beam from said target; and means for detecting said reflected beam and thereby determining a distance of said target from said known location.

2. A chromatic optical ranging sensor according to claim 1, further comprising:

means for establishing a precise time base of said time modulated beam; and means for determining an amplitude of said time modulated beam as a function of time.

3. A chromatic optical ranging sensor according to claim 2, wherein said means for modulating a plurality of optical energy wavelengths over time includes an acousto-optic modulator.

4. A chromatic optical ranging sensor according to claim 1, wherein said means for focusing includes one of a diffractive lens, an objective lens, a diffractive mirror, and a micro-Fresnel lens.

5. A chromatic optical ranging sensor according to claim 1, wherein said means for modulating a plurality of optical energy wavelengths over time includes a photoelastic crystal and a diffraction grating.

6. A chromatic optical ranging sensor according to claim 1, wherein said means for modulating a plurality of optical energy wavelengths over time includes a tunable filter and a birefringent acousto-optic crystal.

7. A chromatic optical ranging sensor according to claim 1, wherein said means for detecting said reflected beam and determining includes means for dispersing said reflected beam.

8. A chromatic optical ranging sensor according to claim 7, wherein said means for detecting said reflected beam and determining includes one of a high-gain avalanche photodiode, a silicon PIN diode, a charge coupled device, a microchannel plate image intensifier, and a linear position sensing detector.

9. A chromatic optical ranging sensor comprising:

means for time modulating optical energy by wavelength to produce a time modulated beam;

means for focusing said time modulated beam onto a target from a known location, whereby different wavelengths of said time modulated beam are focused at different distances from said known location;

means for collecting a reflected beam from said target; and means for detecting and interpolating said reflected beam to determine a distance of said target from said known location, said means for detecting and interpolating including means for separating said reflected beam into a focused portion and an unfocused portion and means for indicating a function of an amplitude of said focused portion and an amplitude of said unfocused portion.

10. A sensor as in claim 9, wherein said function is a ratio of said amplitude of said focused portion to an amplitude of said unfocused portion.

11. A three-dimensional sensor, comprising:

means for providing broadband, high intensity optical energy;

said optical energy including a plurality of individual wavelength components;

means for polarizing said optical energy;

means for tuning said polarized optical energy so that said range of polarizations of said optical energy corresponds to a range of optical wavelengths;

means for selectively transmitting said optical energy according to a particular oriented polarization;

means for focusing said optical energy onto a target from a known location;

means for collecting a reflected beam from said target; and means for detecting said reflected beam and thereby determining a distance of said target from said known location.

12. A three-dimensional sensor according to claim 11, further comprising:

means for establishing a precise time base of said selectively transmitted optical energy; and means for determining an amplitude of said selectively transmitted optical energy as a function of time.

13. A three-dimensional sensor according to claim 11, wherein said focusing means is one of a diffraction-limited lens, an objective lens, a diffractive mirror, and a micro-Fresnel lens.

14. A precision ranging sensor comprising:

a polychromatic source of light;

means for illuminating a target with a spot of said polychromatic light to produce a reflected beam;

means for applying dispersion to said polychromatic light, whereby different wavelengths of said polychromatic light are focusable at different distances; and means for detecting a wavelength at which said reflected beam has a maximum amplitude, wherein said maximum amplitude is related to a distance between said target and said means for applying dispersion.

15. A sensor according to claim 14, wherein said means for detecting a wavelength includes:

means for applying a temporal change in a wavelength of said polychromatic light reflected from said target; and means for detecting a time at which said maximum amplitude occurs, said time being related to said distance.

16. A sensor according to claim 14, wherein said means for detecting a wavelength includes an array detector.

17. A sensor according to claim 14, wherein said means for detecting a wavelength includes means for separating said reflected beam into a focused portion and an unfocused portion.

18. A precision ranging sensor comprising:

a polychromatic source of light;

means for illuminating a target with a spot of said polychromatic light to produce a reflected beam;

means for applying dispersion to said polychromatic light, whereby different wavelengths of said polychromatic light are focusable at different distances; and means for detecting a wavelength at which said reflected beam has a maximum amplitude wherein said maximum amplitude is related to a distance between said target and said means for applying dispersion, said means for detecting a wavelength including means for simultaneously reflecting at least a plurality of wavelengths of said polychromatic light from said spot to produce a reflected beam;

means for applying dispersion to said reflected beam;

means for transversely deflecting said reflected beam an amount related to each of said plurality of wavelengths; and means for detecting a transverse position of a maximum amplitude of the transversely deflected reflected beam, whereby said transverse position is related to a distance between said target and said means for applying dispersion.

19. A precision ranging sensor comprising:

a polychromatic source of light;

means for illuminating a target with a spot of said polychromatic light to produce a reflected beam;

means for applying dispersion to said polychromatic light, whereby different wavelengths of said polychromatic light are focusable at different distances; and means for detecting a wavelength at which said reflected beam has a maximum amplitude, said means for detecting a wavelength including a linear position sensing detector.

20. A chromatic optical ranging sensor, comprising:

means for modulating a plurality of optical energy wavelengths over time to produce a time modulated beam;

means for focusing said time modulated beam onto a target from a known location, whereby different wavelengths of said time modulated beam are focused at different distances from said known location;

means for collecting a reflected beam from said target;

means for detecting said reflected beam and thereby determining a distance of said target from said known location; and means for compensating for wavelength dependent reflectivity in said target.

21. A chromatic optical ranging sensor, comprising:

means for focusing a source beam of optical energy onto a target from a known location, whereby different wavelengths of said source beam are focused at different distances from said known location;

means for collecting a reflected beam from said target;

means for detecting said reflected beam and thereby determining a distance of said target from said known location; and means for compensating for wavelength dependent reflectivity in said target.

22. A three-dimensional sensor, comprising:

means for providing broadband, high intensity optical energy;

said optical energy including a plurality of individual wavelength components;

means for polarizing said optical energy;

means for tuning said polarized optical energy so that said range of polarizations of said optical energy corresponds to a range of optical wavelengths;

means for selectively transmitting said optical energy according to a particular oriented polarization;

means for focusing said optical energy onto a target from a known location;

means for collecting a reflected beam from said target;

means for detecting said reflected beam and thereby determining a range of said target from said known location; and means for compensating for wavelength dependent reflectivity in said target.

23. A precision ranging sensor comprising:

a polychromatic source of light;

means for illuminating a target with a spot of said polychromatic light to produce a reflected beam;

means for applying dispersion to said polychromatic light, whereby different wavelengths of said polychromatic light are focusable at different distances;

means for detecting a wavelength at which said reflected beam has a maximum amplitude, wherein said maximum amplitude is related to a distance between said target and said means for applying dispersion; and means for compensating for wavelength dependent reflectivity in said target.

24. A chromatic optical ranging sensor, comprising:

means for modulating a plurality of optical energy wavelengths over time to produce a time modulated beam;

means for focusing said time modulated beam onto a target from a known location, whereby different wavelengths of said time modulated beam are focused at different distances from said known location;

means for collecting a reflected beam from said target; and means for detecting said reflected beam and thereby determining a distance of said target from said known location;

said means for detecting including means for compensating for a variation in reflectivity with wavelength of said target, said means for compensating including means for detecting first and second portions of said reflected beam, said first portion being focused at a point and said second portion being unfocused, said means for compensating further including means for generating a signal combining a result of said detecting said first portion with a result of said detecting a second portion.

25. A chromatic optical ranging sensor, comprising:

an optical device;

said optical device focusing collimated light at a point of focus;

said collimated light being light reflected from a surface illuminated by a source focused on said surface by a chromatically dispersive optical element so that a wavelength of reflected collimated light from said surface is dependent on a range of said surface from said dispersive element, whereby said point of focus depends on said range;

a receiver having a first receiver portion sized to detect maximum amount of said collimated light when said point of focus coincides with said first receiver portion;

a first portion of said collimated light that falls on a second portion of said receiver being directed to a first detector of said receiver, said first detector outputting a first signal;

a second portion of said collimated light that falls on said first receiver portion being directed to a second detector to produce a second intensity signal; and an indicator connected to receive both said first and said second signals and outputting a third signal responsive to both said first and said second signals.

26. A sensor as in claim 25, wherein:

a reflectivity of said surface is wavelength-dependent;

said third signal is less responsive to a wavelength of said collimate light than said second signal.

27. A sensor as in claim 25, wherein said third signal is a function of a ratio of said first and second signals.

28. A sensor as in claim 25, wherein said receiver includes first and second light guides, said first light guide optically connecting said first receiver portion to said first detector and said second light guide optically connecting said second receiver portion to said first detector.

29. A sensor as in claim 25, wherein said receiver includes:
   a beam splitter directing said collimated light along first and second optical axes, whereby two points of focus are defined, one on each of said first and second optical axes;
   a light-blocking element with an aperture coinciding with a first of said to points of focus;
   a light-blocking element whose size is approximately the same as said aperture positioned the same optical distance from said beam splitter as said aperture.

30. A sensor as in claim 25, wherein:
   said first detector has an aperture;
   said second detector is positioned to receive light that passes through said aperture.

31. A sensor as in claim 30, wherein said first detector includes a beam splitter, said aperture being in said beam splitter.

32. A chromatic optical ranging system comprising:
   a light source;
   means for focusing a spot of said light source on a surface;
   said light having at least first and second selectable optical wavelengths;
   said first and second optical wavelengths being present at different times;
   a chromatically dispersive optical element in a path of said light from said spot;
   a first lens effective to focus said light on an object;
   a second lens effective to produce a focus of light from said object;
   chromatic dispersivity of said chromatically dispersive optical element producing said focus for said first optical wavelength at a position displaced from said focus for said second optical wavelength;
   a first detector at said focus for said first optical wavelength;
   said first detector having an area effective to receive substantially all of said first optical wavelength; and
   a second detector receiving a portion of said second optical wavelength which falls outside said area.

33. A chromatic optical ranging system according to claim 32, wherein said means for focusing includes said chromatically dispersive optical element focusing a spot of said first optical wavelength on said surface, and impinging said second optical wavelength on said surface substantially defocused.

* * * * *